US007370281B2

(12) United States Patent
Weber

(10) Patent No.: US 7,370,281 B2
(45) Date of Patent: May 6, 2008

(54) SYSTEM AND METHOD FOR SMART DRAG-AND-DROP FUNCTIONALITY

(75) Inventor: Roger Weber, Lynnwood, WA (US)

(73) Assignee: BEA Systems, Inc., San Jose, CA (US)

( * ) Notice: Subject to any disclaimer, the term of this patent is extended or adjusted under 35 U.S.C. 154(b) by 135 days.

(21) Appl. No.: 10/179,858

(22) Filed: Jun. 25, 2002

(65) Prior Publication Data
US 2003/0160825 A1 Aug. 28, 2003

Related U.S. Application Data

(60) Provisional application No. 60/359,232, filed on Feb. 22, 2002.

(51) Int. Cl.
*G06F 3/00* (2006.01)
(52) U.S. Cl. .................. 715/769; 715/770; 715/853; 715/854; 715/851; 709/329
(58) Field of Classification Search ................ 715/769, 715/770, 853, 854, 851, 835, 764; 707/102; 709/329
See application file for complete search history.

(56) References Cited

U.S. PATENT DOCUMENTS

| | | | | |
|---|---|---|---|---|
| 5,196,838 A | * | 3/1993 | Meier et al. ................. | 345/684 |
| 5,754,178 A | * | 5/1998 | Johnston, Jr. et al. ...... | 345/803 |
| 5,760,773 A | * | 6/1998 | Berman et al. ............. | 345/808 |
| 5,767,851 A | | 6/1998 | Yee et al. .................... | 715/346 |
| 5,802,514 A | * | 9/1998 | Huber ........................... | 707/4 |
| 5,917,493 A | | 6/1999 | Tan et al. .................... | 715/358 |
| 5,999,178 A | * | 12/1999 | Hwang et al. .............. | 345/835 |
| 6,002,402 A | | 12/1999 | Schacher .................... | 715/352 |

(Continued)

OTHER PUBLICATIONS

Java Samples, "What is a Java Package and How to Use it?", http://www.java-samples.com/forprinting.php?tutorialid=289, Oct. 23, 2007, 2 pages.

(Continued)

*Primary Examiner*—Weilun Lo
*Assistant Examiner*—Mylinh Tran
(74) *Attorney, Agent, or Firm*—Fliesler Meyer LLP

(57) ABSTRACT

The invention provides a system and method for providing smart file import and drag-and-drop functionality in a graphical user interface environment. As a file is dragged and dropped onto a set of folders using an explorer-like interface, the system automatically determines into which folder the file should be placed. If the folder does not already exist, then it is automatically created. A similar process can be used for file imports. The system is particularly useful for manipulating Java, Java derivative, or Java-related source files (including JAVA, JWS, CTRL, JWI, JAR, class files, etc.) in a Java application development environment, since in this type of environment the location of the file within the folder tree can be very important. Other embodiments of the invention include an icon-display mechanism which denotes to the user that the Smart Drop processing will take precedence over the normal drop behavior.

20 Claims, 3 Drawing Sheets

Smart Drop

U.S. PATENT DOCUMENTS

| | | | |
|---|---|---|---|
| 6,212,577 B1* | 4/2001 | Stern et al. | 719/329 |
| 6,456,306 B1* | 9/2002 | Chin et al. | 345/810 |
| 6,642,946 B1* | 11/2003 | Janes et al. | 345/854 |
| 2002/0161777 A1* | 10/2002 | Smialek | 707/102 |
| 2003/0100999 A1* | 5/2003 | Markowitz | 702/20 |
| 2003/0208639 A1* | 11/2003 | Stern et al. | 709/329 |
| 2004/0117333 A1* | 6/2004 | Voudouris et al. | 706/13 |

OTHER PUBLICATIONS

Java (Sun) FAQ, "The Use of Classpath and The Package Statement", htto://ww.tek-tips.com/faq.cfm?fid=3026, Oct. 10, 2007, 2 pages.

* cited by examiner

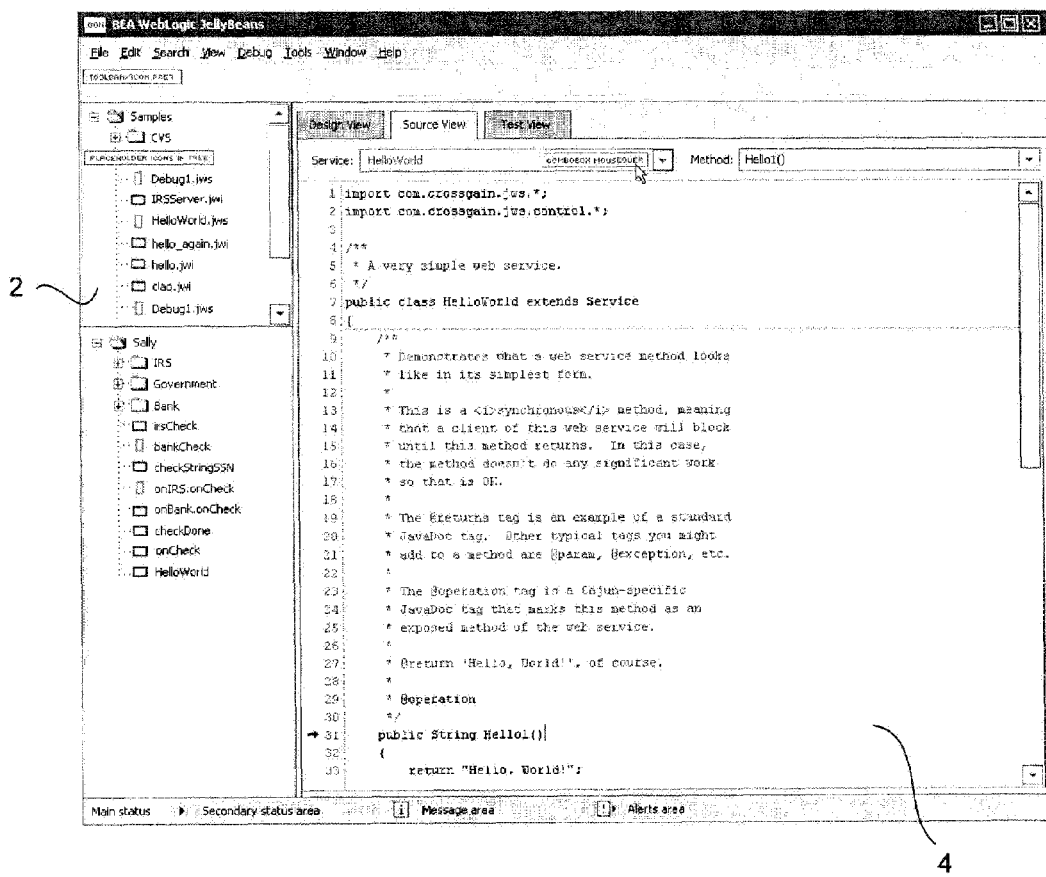
Figure 1  Typical IDE Display

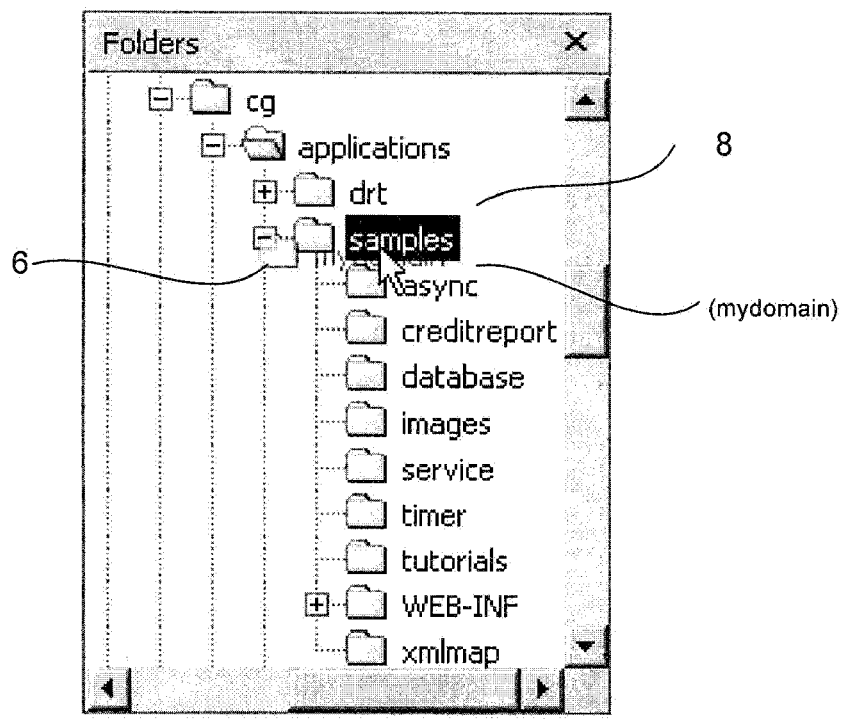
Figure 2  Normal Drop
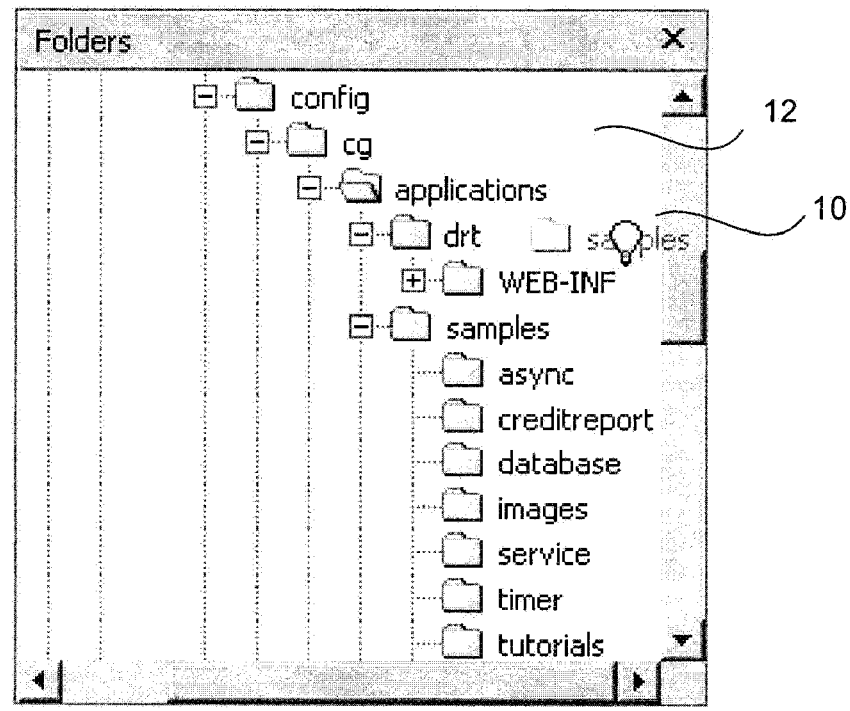
Figure 3  Smart Drop

SYSTEM AND METHOD FOR SMART DRAG-AND-DROP FUNCTIONALITY

CLAIM OF PRIORITY

This application claims priority from provisional application "SYSTEM AND METHOD FOR SMART DRAG-AND-DROP FUNCTIONALITY" Application No. 60/359,232 filed Feb. 22, 2002, and which application is incorporated herein by reference.

COPYRIGHT NOTICE

A portion of the disclosure of this patent contains material which is subject to copyright protection. The copyright owner has obligation to the facsimile reproduction by anyone of the patent document of the patent disclosure, as is appears in the Patent and Trademark Office patent file or records, but otherwise reserves all copyrights whatsoever.

FIELD OF THE INVENTION

The invention relates generally to human-computer interfaces, and graphical user interfaces, and particularly to a system and method for providing drag-and-drop functionality in a graphical environment.

BACKGROUND

With the prevalent use of graphical user environments to assist computer users in interacting with, and getting the most out of their computer systems, one of the most common interfaces a user works with is the explorer-type tree found in such products as Windows Explorer and Xtree. The explorer-type tree (or simply the explorer tree) is used to navigate among hierarchical folders in an easy, intuitive, manner. Computer files can be moved or copied from one folder to another simply by dragging and dropping the file onto the destination folder.

The explorer tree interface has been extensively used in computer programming and integrated development environments (IDE's) to assist the programmer in placing computer files into their proper location prior to compilation, linking, or run-time deployment. This placing of files into their proper places is of particular importance when programming in Java, since different file types must typically be placed into particular locations for proper functioning of the IDE and for successful generation of Java applications. Several of these file layout and placement requirements are described in the Java™ Servlet Specification Version 2.3, Sun Microsystems, Inc., Palo Alto, Calif., U.S.A., incorporated by reference herein. The requirements for proper file location extends to other Java derivative technologies such as web services development IDE's, for development of web applications. Mechanisms which can assist the software programmer or developer in ensuring the quick and accurate placement of files are of great benefit in ensuring optimal use of the programmers time, and minimizing any inconsistencies due to misplaced file location.

SUMMARY

The invention provides a system and method for providing smart drag-and-drop functionality in a graphical user interface environment. As a file is dragged and dropped into the explorer tree and onto a folder or a file node using an explorer-like interface, normal processing occurs. However, when file is dragged and dropped into the explorer tree, but not onto a set of folders using an explorer-like interface, the system automatically determines into which folder the file should be placed. If the folder does not already exist, then it is automatically created. The system is particularly useful for manipulating Java, Java derivative, or Java-related source files (JWS, CTRL, JWI, JAR, class files, etc.) in a Java application development environment, since in this type of environment the location of the file within the folder tree can be very important. Other embodiments of the invention include an icon-display mechanism which denotes to the user that the smart drop processing of an embodiment of the invention will take precedence over the normal drop behavior.

In one embodiment, the invention comprises a method of providing a smart drag-and-drop mechanism for use in a graphical user interface environment, comprising the steps of: receiving an instruction to drop the file object into said explorer tree; determining a destination directory hierarchy; and, one of copying or moving said file object into a determined destination directory within said directory hierarchy.

In another embodiment, the invention comprises a method of providing a smart import mechanism for use in a hierarchical file system environment, comprising the steps of: receiving an instruction to import a file object into a file hierarchy; determining a destination directory hierarchy; and, one of copying or moving said file object into a determined destination directory within said directory hierarchy.

In a further embodiment, the invention comprises a system for providing a smart drag-and-drop mechanism for use in a graphical user interface environment, comprising: means for receiving an instruction to drop a file object into an explorer tree; means for determining a destination directory hierarchy; and means for one of copying or moving said file object into a determined destination directory within said directory hierarchy.

In a further embodiment, the invention comprises a system for providing a smart drag-and-drop mechanism for use in a hierarchical file system environment, comprising: means for receiving an instruction to import a file object into a file hierarchy; means for determining a destination directory hierarchy; and means for one of copying or moving said file object into a determined destination directory within said directory hierarchy.

In a further embodiment, the invention comprises a method of providing a smart drag-and-drop mechanism for use in a graphical user interface environment, comprising the steps of: (A) monitoring a file object being dragged onto an explorer tree; (B) determining if the file should be dropped using a normal drop or a smart drop; (C) receiving an instruction to drop a file object into an explorer tree; and, (D) if the file should be dropped using a smart drop, then the substeps of (D.1) determining a destination directory hierarchy; and, (D.2) one of copying or moving said file object into a determined destination directory within said directory hierarchy.

Additional embodiments, aspects, objects, and advantages of the invention will be evident from the specification, claims, and figures.

BRIEF DESCRIPTION OF THE DRAWINGS

FIG. 1 shows an illustration of an typical graphical explorer-like tree environment for use with the invention.

FIG. 2 shows an illustration of a normal drag-and-drop in accordance with the invention.

FIG. 3 shows an illustration of a smart drag-and-drop in accordance with the invention.

DETAILED DESCRIPTION

Figure 4:
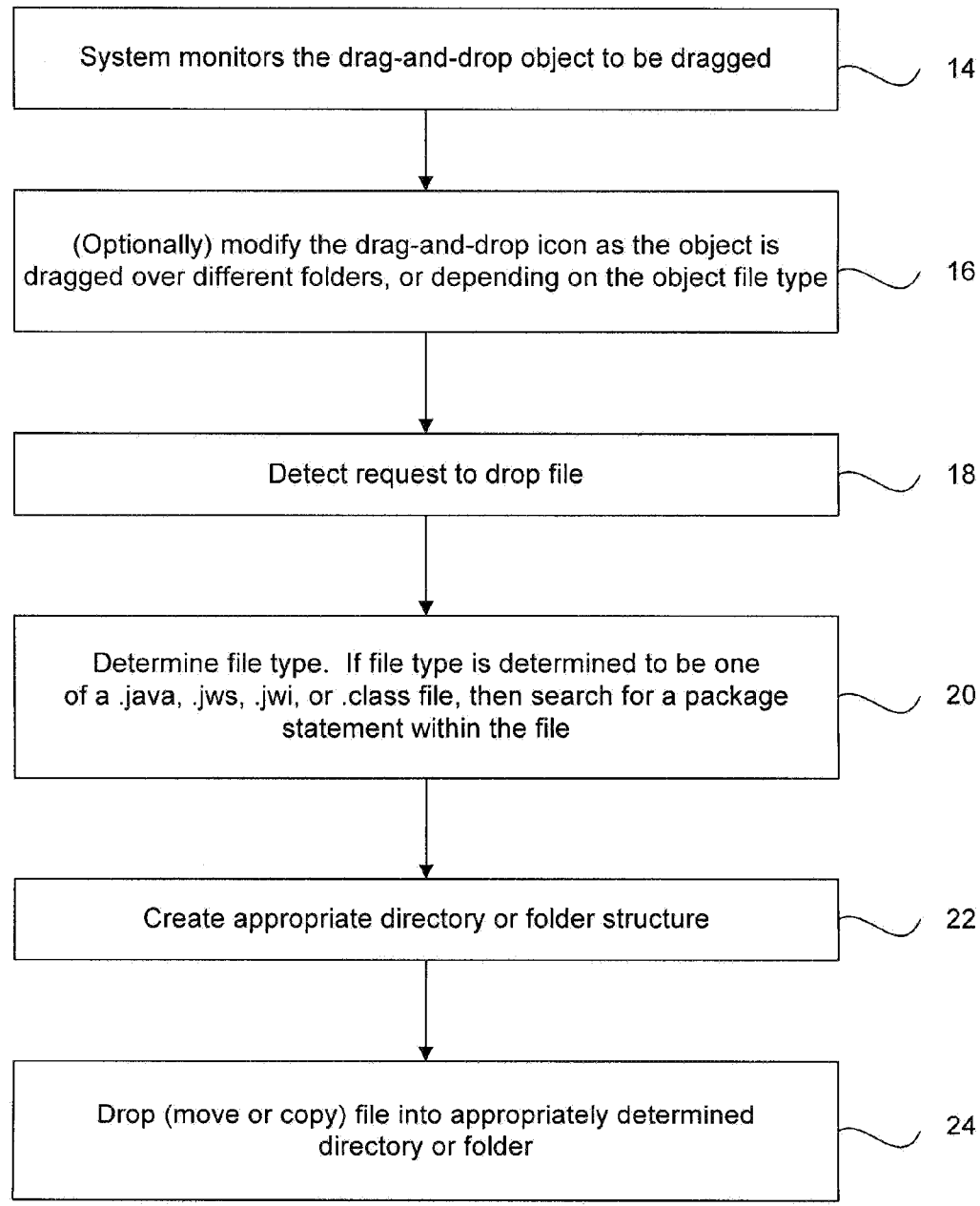
FIG. 4 is a flowchart of a smart drag-and-drop mechanism in accordance with an embodiment of the invention.

Generally described, the invention provides a system and method for providing smart drag-and-drop functionality in a graphical user interface environment. As a file is dragged and dropped (or simply dropped) onto a set of folders using an explorer-like interface, the system automatically determines into which folder the file should be placed. If the folder does not already exist, then it is automatically created. The system is particularly useful for manipulating Java, Java derivative, or Java-related source files (JAVA, JWS, CTRL, JWI, JAR, class files, etc.) in a Java application development environment, since in this type of environment the location of the file within the folder tree can be very important. Other embodiments of the invention include an icon-display mechanism which denotes to the user that this "smart drop" processing will take precedence over the normal drop behavior.

Java File and Folder Layout

The Java™ Servlet Specification, incorporated herein, specifies that a web application should be developed as a structured hierarchy of directories. The root of this hierarchy serves as the document root for files that are in turn part of the final application. The main purpose of this is to minimize potential conflicts in the URL name space. Within this hierarchy, a special directory or folder exists named "WEB-INF". The WEB-INF directory contains files related to the application that are not in the document root. While the WEB-INF node is not part of the public document tree of the application, the contents of the WEB-INF directory are visible to servlet code using the get Resource and get Resource As Stream method calls on the Servlet Context. If the developer needs access to application specific configuration information or files that should not be exposed to the web client, such information or files should be placed under this directory. The contents of the WEB-INF directory include:

- a /WEB-INF/web.xml deployment descriptor.
- a /WEB-INF/classes/ directory for servlet and utility classes.
- a /WEB-INF/lib/ area for Java ARchive (JAR) files, servlets, beans, and other utility classes useful to the web application.

The following listing of files illustrates that of a sample web application as based on the Java™ Servlet Specification:

```
/index.html
/welcome.jsp
/images/welcome.gif
/WEB-INF/web.xml
/WEB-INF/lib/welcome_beans.jar
/WEB-INF/classes/welcome_project/servlets/welcome.class
```

Since physical file location is important in systems such as these, the files themselves typically include package statements that define correct directories. The example JWS source file shown below illustrates the use of a package statement as it may be found within a JWS or Java file:

```
package mypackage;
import java.util.*;
import java.text.*;
/* Credit reporting service.
    @implements wsdl="CreditReportWsdl.wsdl"
*/
public class CreditReport extends Service
{
/* Somebody requests a credit report.*/
            public void requestReport (String ssn)
{
            citi.startCustomerAnalysis (ssn);
}
/*
* Request status report, and deliver as XML.
*
    @operation
    @conversation continue
    @outputPart name=creditReport
    mimeType="text/xml"
    xmlMap: :
    <creditReport>
    <bankReport>{result.bank}</bankReport>
    </creditReport>
*/
```

The first line of the sample file shown above includes a package identifier statement package mypackage; JWS files and similar files define classes that can live in any package, but the JWS specification enforces directory names and file names that correspond to the fully-qualified class names of generated code. Since the example JWS file shown above declares a class named "mypackage.CreditReport", the JWS file must be located inside the web application at /mypackage/CreditReport.jws. If this file path does not match the fully-qualified class name, it will cause the system to generate a compile-time error.

Drag and Drop within the Project Browser

In an application development environment or IDE in accordance with the invention, a tree rendering of the web application file space is typically presented to the developer to allow manipulation of the development files. The tree rendering or "project tree" displays all current projects under development and is heavily used during the development process. In particular the project tree can show separate icons for each item corresponding to a particular file type, such as JWS, Java, JavaScript, CTRL, JWI, XML, HTML, JSP, GIF, JPEG, and other files. FIG. 1 shows an illustration of such a project tree as viewed by the user, including a project tree browser component 2, and an editor component 4.

Dragging to the Project Browser

Files dropped to the browser are copied into the current project. In the normal embodiment files are copied in to the directory or parent directory under the drop point. In the smart drop embodiment files are copied depending on the file type and contents. The system reacts differently in the way in which the file is handled and the location in which it is placed to best assist the developer in creating or updating a software application.

If the file extension is a Java, Java derivative, or Java-related source file, for example java,jws, ctrl, or jwi, the file is searched for a package statement, the appropriate directory structure is created in project root and the file is dropped in the package appropriate directory.

If the file extension is class the file is searched for a package statement, the appropriate directory structure is created in WEB-INF/classes directory, and the file is dropped in the package appropriate directory.

If the file extension is jar, the file is moved into the WEB-INF/lib directory.

FIG. 2 illustrates a normal drag-and-drop in accordance with the invention. As shown in FIG. 2, in the normal drop the file or folder 6 (in this example a "my domain" folder) is dragged onto a particular folder 8 and that folder (in this example the "samples" folder) is selected as the drop target. This is the normal drag-and-drop mechanism found in explorer-type interfaces.

FIG. 3 illustrates a "smart drop" in accordance with the invention. Depending on the particular embodiment or implementation employed, the smart drop feature can be configured as a manual (i.e. user-selected) process, or as an automatic process. A manual process requires the user to signal to the system that they want to use the smart drop feature, perhaps by clicking with the right-mouse-button, or holding down the CTRL key while dragging the file object. The automatic process is perhaps more efficient. To automatically activate and use the smart drop feature, the file or folder object is simply dragged into the general area of the browser tree 12, but not over any existing folder. As the file or folder object is dragged, the system monitors it's location with respect to the underlying folder hierarchy. If the file is dragged over a specific folder, the smart drop feature is automatically turned off (i.e. the file object is not smart-dropped). If however, the file is dragged to a vacant space in the explorer tree and not over a specific folder, the smart drop feature is automatically turned on and when dropped the file is smart-dropped into the correct folder (assuming the file is of an appropriate type and there is a valid package statement).

When using the automatic smart drop feature as described above, the actual drop will not be onto a particular folder, so in the example shown in FIG. 3 no folder is visibly selected. Instead, an embodiment of the invention allows the mouse pointer icon 10 to change to indicate that a smart drop will occur. In the example shown, the icon changes to resemble a light bulb to indicate that if the file is released (dropped) at that moment, then the smart drop will be used. It will be evident that other types of icon could be used, and that embodiments of the smart drop feature can work equally well without the use of such an icon. The icon is used primarily to visibly inform the user of the operation of the smart drag-and-drop feature, but does not affect the underlying mechanism of the smart drop. Similarly as described above, to automatically activate a smart drop feature that incorporates a visible icon, the file or folder object is dragged just into the general area of the browser tree 12, but not over any existing folder. While being dragged, the system automatically displays the light bulb icon over the file or folder to denote the use of smart drop and the appropriately determined destination folder (the "samples" folder in this example).

The smart drop feature works with folders or with individual files. If the folder being dragged contains many individual files, then each file is tested and "smart-dropped" into the correct place. If there is no special designation for a file it is moved into the root folder.

FIG. 4 illustrates a flow chart of the method used by the invention to automatically create destination folders and deploy files to those folders, depending on the file type and contents. As shown in FIG. 4, in step 14 during a smart drop, or when the smart drop feature is automatically activated, the system monitors the object to be dragged. An optional step 16 allows the drag-and-drop icon to be automatically modified as the object is dragged over different folders or within the explorer tree area, or depending on the object file type. When the user signals (either through releasing the mouse button or by some other method) that the file should be dropped, the system in step 18 detects this request. The file type is determined in step 20, and if it is determined to be a Java, Java derivative, or Java-related source file (for example a .java, .jws, .ctrl, .jwi, or .class file), then the system searches for a package statement within the file. Based on the information in this package statement the system, in step 22, an appropriate directory or folder structure is created. In step 24 the file is smart-dropped (i.e. either copied or moved) into the appropriately determined directory or folder. In this manner the system ensures the correct placement of Java, Java derivative, and Java-related source files (JWS, CTRL, JWI, JAR, class, etc.) in a Java IDE, in which type of environment the location of the file within the folder tree is very important.

It will be evident that while the above example applies the smart drop feature to use with Java, Java derivative, or Java-related source files, including .java, .jws, .ctrl, .jwi, and .class files, the smart drop feature can be easily extended to work with any type of file and any type of system that requires smart placement of files or objects within a hierarchy of folders.

Use of the Smart Drop in a File Import Routine

While the description above describes an implementation in which the user drags and drops the files from one location to another using an explorer-type window, it will be evident that the mechanism used to create the smart drop can be incorporated into other file management functions and utilities. Particularly, in one embodiment, the smart drop feature can be included in, for example, a file import mechanism. In accordance with this embodiment only steps 20 through 24 of FIG. 4 are used. A typical implementation would allow the user to select, e.g. a "Smart File Import" feature from the desktop or menu bar. After selecting one or more files or folders to import, the system would automatically smart drop the selected files into appropriate folders. As each file is imported, the file type is determined (step 20), and if it is determined to be a Java, Java derivative, or Java-related source file, including .java, .jws, .ctrl, .jwi, or .class file, then the system searches for a package statement within the file. Based on the information in this package statement the system creates an appropriate directory or folder structure (step 22). The file is then smart-dropped (or perhaps more appropriately "smart imported") into the appropriately determined directory or folder (step 24).

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that the various smart drop and smart import mechanisms can be incorporated into other types of file management utilities beyond those described. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method of providing a smart drag-and-drop mechanism for use in a graphical user interface environment, comprising the steps of:

allowing a user of a system to drag a plurality of source code files into an explorer interface at the system, wherein each of the plurality of source code files includes a source code text, software class declarations, and a package statement defined within the text of the source code that identifies a name space and a correct destination directory into which the software classes are to be stored;

after receiving an instruction from the user to drop the plurality of source code files into a vacant portion of the explorer interface, other than onto a particular folder;

determining that the instruction is for a smart drop;

independently for each source code file within the plurality of source code files searching within the text of the source code for the package statement defined therein, and the name space identified by the package statement;

determining a destination directory hierarchy that corresponds to the name space identified in the package statement, including creating the destination directory hierarchy for the name space if it does not already exist;

one of copying or moving the source code file into the correct destination directory within said directory hierarchy that matches the name space identified in the package statement for that source code file; and repeating the steps of searching, determining, and one of copying or moving, for each of the plurality of source code files that were dropped;

wherein, for each source code file that is copied or moved using a smart drop, the destination directory hierarchy and the destination directory for that source code file is automatically determined by the system using the package statement within that source code file, independently of any folder currently selected by the user or any of the other source code files being copied or moved at the same time.

2. The method of claim 1 wherein the step of determining a destination directory hierarchy is based on the type of source code file being dropped.

3. The method of claim 1 wherein the source code file is one of a Java, Java derivative, or Java-related source file.

4. The method of claim 1 including:

using an icon to indicate when a smart drop mechanism is being employed.

5. A system for providing a smart drag-and-drop mechanism for use in a graphical user interface environment, comprising:

means for allowing a user of a system to drag a plurality of source code files into an explorer interface at the system, wherein each of the plurality of source code files includes a source code text, software class declarations, and a package statement defined within the text of the source code that identifies a name space and a correct destination directory into which the software classes are to be stored means for receiving an instruction from the user to drop the plurality of source code files into a vacant portion of the explorer interface, other than onto a particular folder;

means for automatically determining if the file type matches one of a number of file types that may include a package statement, and if the file type does match one of the number of file types that may include a package statement, then, for each source code file when the source code file has been dropped, searching for a package statement within the source code file;

automatically determining by the system a destination directory hierarchy;

copying said source code file into a determined destination directory within said directory hierarchy; and repeating the steps of automatically determining and copying, for each of the remaining source code files that were dropped wherein, for each source code file, the destination directory hierarchy and the destination directory are automatically determined by the system to match the package statement within that source code file, independently of any folder that is currently displayed or currently selected within the explorer like interface.

6. The system of claim 5 wherein said means for determining the destination directory hierarchy uses the type of source code file being dropped to determine the destination directory hierarchy.

7. The system of claim 5 wherein the source code file is one of a Java, Java derivative, or Java-related source file.

8. The system of claim 5 including:

means for using an icon to indicate when a smart drop mechanism is being employed.

9. A system for providing a smart drag-and-drop mechanism for use in a Java application development environment, comprising:

means for displaying on a screen at a system, a Java application development environment having an explorer like interface, including a plurality of directories and files therein that together comprise an application source;

means for allowing a user of a system to drag a plurality of source code files into an explorer interface at the system, wherein each of the plurality of source code files includes a source code text, software class declarations, and a package statement defined within the text of the source code that identifies a name space and a correct destination directory into which the software classes are to be stored;

means for receiving an instruction to drop the plurality of source code files into a vacant portion of the explorer interface, other than onto a particular folder;

means for determining if the file type matches one of a number of Java file types that may include a package statement, and, if the file type does match one of the number of Java file types that may include a package statement then parsing the package statement to determine the package within the application to which the source code file belongs, and automatically creating, for each source code file and independently of any directory that may be currently selected in the explorer like interface, a hierarchy of directories and a destination directory for the source code file, that matches the package statement in that source code file; and means for copying the source code file into the destination directory.

10. The system of claim 9, wherein the means for allowing a user to drag a source code file into the explorer like interface includes one of a mouse pointer and icon, that changes automatically during a drag over a folder or the explorer like interface, to indicate whether a subsequent drop will be either a normal drop or a smart drop, wherein a normal drop drops the source code file into the folder, and wherein a smart drop invokes the means for parsing the package statement within the source code file, automatically creating the destination directory for the source code file, and one of copying and moving the source code file into the destination directory.

11. The system of claim 9, wherein the means for parsing the package statement within the source code file, automatically creating the destination directory for the source code file, and one of copying and moving the source code file into the destination directory, is invoked when the source code file is dropped anywhere on the explorer like interface other than an existing folder in the explorer like interface.

12. A method of providing a smart drag-and-drop mechanism for use in a Java application development environment, comprising the steps of:
    displaying on a screen at a system, a Java application development environment having an explorer like interface, including a plurality of directories and files therein that together comprise an application source;
    allowing a user of a system to drag a plurality of source code files into an explorer interface at the system, wherein each of the plurality of source code files includes a source code text, software class declarations, and a package statement defined within the text of the source code that identifies a name space and a correct destination directory into which the software classes are to be stored;
    receiving an instruction to drop the plurality of source code files into a vacant portion of the explorer interface, other than onto a particular folder;
    determining if the file type matches one of a specified number of Java file types that may include a package statement;
    if the file type does match one of the specified number of Java file types that may include a package statement, then parsing the package statement to determine the package within the application to which the source code file belongs, and automatically creating, for each source code file and independently of any directory that may be currently selected in the explorer like interface, a hierarchy of directories and a destination directory for the source code file, that matches the package statement in that source code file; and
    copying the source code file into the destination directory.

13. The method of claim 12, wherein the step of allowing a user to drag a source code file into the explorer like interface includes using one of a mouse pointer and icon, that changes automatically during a drag over a folder or the explorer like interface, to indicate whether a subsequent drop will be either a normal drop or a smart drop, wherein a normal drop drops the source code file into the folder, and wherein a smart drop invokes the step of parsing the package statement within the source code file, automatically creating the destination directory for the source code file, and one of copying and moving the source code file into the destination directory.

14. The method of claim 12, wherein the step of parsing the package statement within the source code file, automatically creating the destination directory for the source code file, and one of copying and moving the source code file into the destination directory, is invoked when the source code file is dropped anywhere on the explorer like interface other than an existing folder in the explorer like interface.

15. A method of providing a smart drag-and-drop mechanism for use in a graphical user interface environment, comprising the steps of:
    allowing a user of a system to drag a source code file into an explorer interface at the system, wherein each source code file includes a source code text, software class declarations, and a package statement defined within the text of the source code that identifies a name space and a correct destination directory into which the software classes are to be stored;
    searching, as the source code file is being dragged into a vacant portion of the explorer interface other than onto a particular folder, within the text of the source code for the package statement defined therein, and the name space identified by the package statement;
    determining a destination directory hierarchy and destination directory that corresponds to the name space identified in the package statement, including creating the destination directory hierarchy for the name space if it does not already exist;
    displaying, over the source code filed being dragged, the correct destination directory or package name that matches the name space identified in the package statement for that source code file; and
    after the source code file has been dropped, one of copying or moving, the source code file that has been dropped into the correct destination directory within said directory hierarchy that matches the name space identified in the package statement for that source code file;
    wherein, for each source code file that is copied or moved, the destination directory hierarchy and the destination directory for that source code file is automatically determined by the system using the package statement within that source code file, independently of any folder currently selected by the user or any of the other source code files being copied or moved at the same time.

16. The method of claim 15 wherein the step of determining a destination directory hierarchy is based on the type of file object being dropped.

17. The method of claim 15 wherein the file object is one of a Java, Java derivative, or Java-related source file.

18. A method of importing a source code file including a package statement, comprising the steps of:
    allowing a user of a system to import a source code file into a system, wherein each source code file includes a source code text, software class declarations, and a package statement defined within the text of the source code that identifies a name space and a correct destination directory into which the software classes are to be stored;
    searching, as the source code file is being imported into the system, within the text of the source code for the package statement defined therein, and the name space identified by the package statement;
    determining a destination directory hierarchy and destination directory that corresponds to the name space identified in the package statement, including creating the destination directory hierarchy for the name space if it does not already exist;
    one of copying or moving, the source code file that has been dropped into the correct destination directory within said directory hierarchy that matches the name space identified in the package statement for that source code file;
    wherein, for each source code file that is copied or moved, the destination directory hierarchy and the destination directory for that source code file is automatically determined by the system using the package statement within that source code file.

19. The method of claim 18 wherein the step of determining a destination directory hierarchy is based on the type of file object being dropped.

20. The method of claim 18 wherein the file object is one of a Java, Java derivative, or Java-related source file.

* * * * *

UNITED STATES PATENT AND TRADEMARK OFFICE
CERTIFICATE OF CORRECTION

| | | |
|---|---|---|
| PATENT NO. | : 7,370,281 B2 | |
| APPLICATION NO. | : 10/179858 | |
| DATED | : May 6, 2008 | |
| INVENTOR(S) | : Weber | |

It is certified that error appears in the above-identified patent and that said Letters Patent is hereby corrected as shown below:

In column 1, line 14, after "patent" insert -- document --.

In column 1, line 16, delete "obligation" and insert -- no objection --, therefor.

In column 1, line 17, delete "document of" and insert -- document or --, therefor.

In column 1, line 17, delete "is" and insert -- it --, therefor.

In column 1, line 19, delete "copyrights" and insert -- copyright rights --, therefor.

In column 2, line 66, delete "an" and insert -- a --, therefor.

In column 3, line 39, delete "get Resource" and insert -- getResource --, therefor.

In column 3, line 39-40, delete "get Resource As Stream" and insert -- getResourceAsStream --, therefor.

In column 3, line 40, delete "Servlet Context." and insert -- ServletContext. --, therefor.

In column 4, line 64, delete "java,jws, ctrl, or jwi," and insert -- .java, .jws, .ctrl, or .jwi, --, therefor.

In column 5, line 1, delete "class" and insert -- .class --, therefor.

In column 5, line 5, delete "jar," and insert -- .jar, --, therefor.

In column 5, line 9, delete ""my domain"" and insert -- "mydomain" --, therefor.

In column 5, line 63, delete "flow chart" and insert -- flowchart --, therefor.

Signed and Sealed this

Ninth Day of February, 2010

David J. Kappos
*Director of the United States Patent and Trademark Office*